United States Patent [19]

Hunter

[11] 4,226,368
[45] Oct. 7, 1980

[54] MULTIPLE VORTEX DRIPPER

[75] Inventor: Edwin J. Hunter, Rancho Santa Fe, Calif.

[73] Assignee: The Toro Company, San Marcos, Calif.

[21] Appl. No.: 871,198

[22] Filed: Jan. 23, 1978

[51] Int. Cl.² .............................................. B05B 1/30
[52] U.S. Cl. ..................................... 239/542; 138/42; 239/570
[58] Field of Search ...................... 239/533.1, 542, 547, 239/468, 570; 138/42, 43; 251/127

[56] References Cited

U.S. PATENT DOCUMENTS

| 2,384,679 | 9/1945 | Holtzclaw | 239/533.1 X |
|---|---|---|---|
| 3,323,550 | 6/1967 | Lee | 239/468 X |
| 3,434,500 | 3/1969 | Burrows | 138/42 |
| 3,753,527 | 8/1973 | Galbraith et al. | 239/542 X |
| 3,810,582 | 5/1974 | Lodge | 239/542 |
| 3,941,350 | 3/1976 | Kluczynski | 138/42 X |
| 3,965,934 | 6/1976 | Rosenberg | 239/542 X |
| 4,011,893 | 3/1977 | Bentley | 239/542 X |
| 4,060,200 | 11/1977 | Mehoudar | 239/542 |
| 4,084,749 | 4/1978 | Drori | 239/542 X |

FOREIGN PATENT DOCUMENTS 2606605 8/1977 Fed. Rep. of Germany .......... 239/542

Primary Examiner—Johnny D. Cherry
Attorney, Agent, or Firm—Poms, Smith, Lande & Rose

[57] ABSTRACT

The present invention discloses a sprinkler head for use in drip irrigation systems. Irrigation fluid entering an inlet is directed through a path comprising a plurality of pressure dropping chambers before emerging through irrigation tubings connected to outlet openings from where the irrigation fluid emerges at a low pressure drip irrigation flow rate. In the preferred embodiment disclosed, the pressure dropping chambers comprise a plurality of series interconnected vortices disposed within stacked plates. The entire assembly can be disassembled for cleaning purposes. The assembly further incorporates an integral pressure regulator for performing an initial step decrease in the pressure of the irrigation fluid before the fluid enters the multiple chambered pressure dropping path. The integral pressure regulator is adjustable and calibrated in gallon per hour flow rates.

9 Claims, 14 Drawing Figures

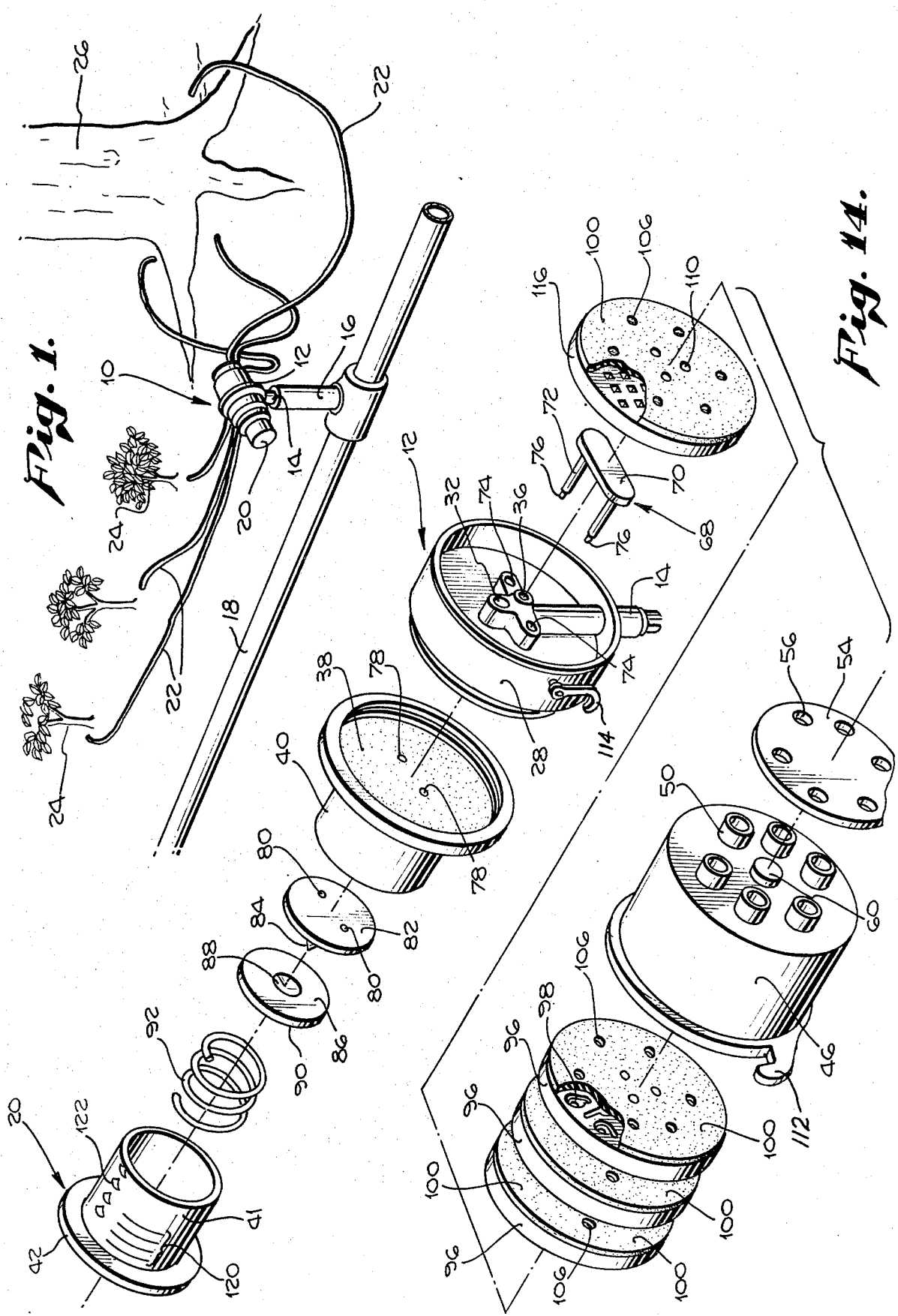

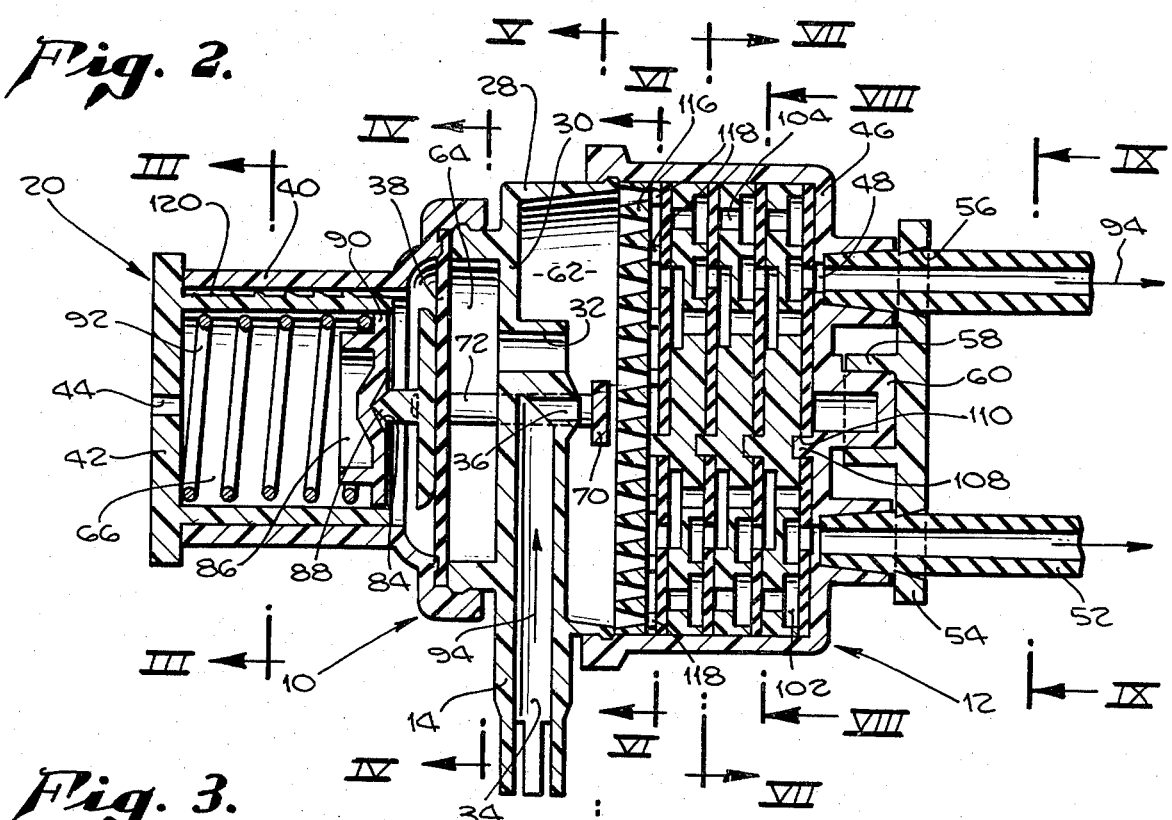

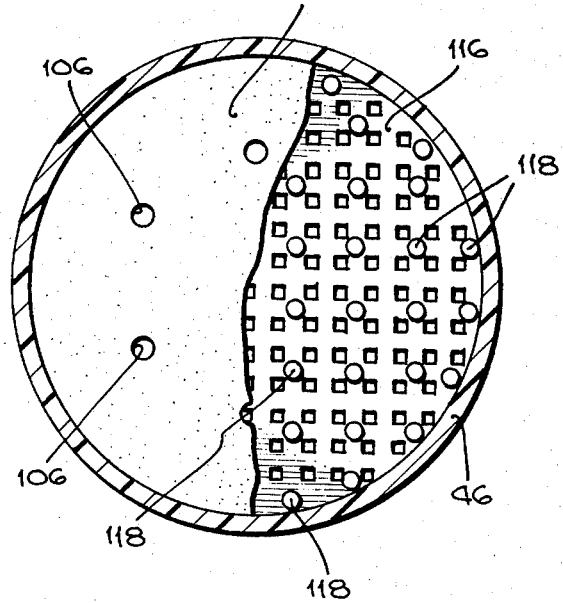
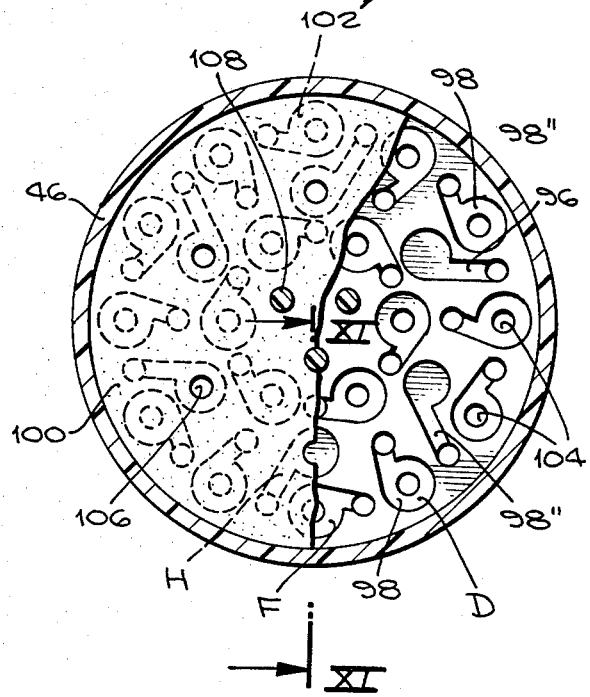
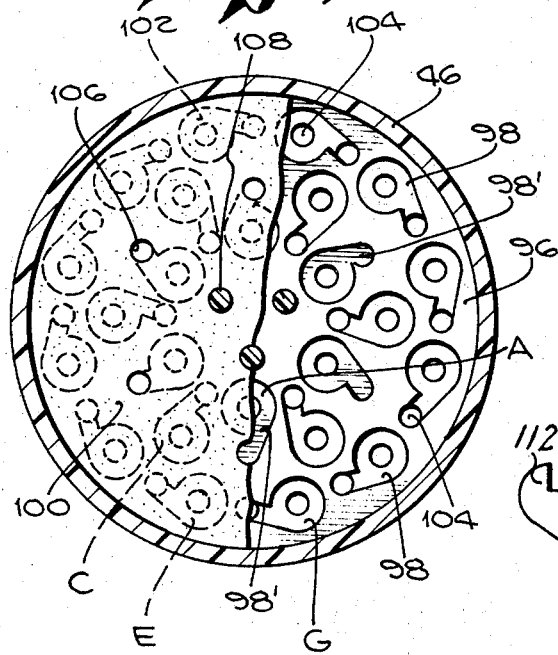
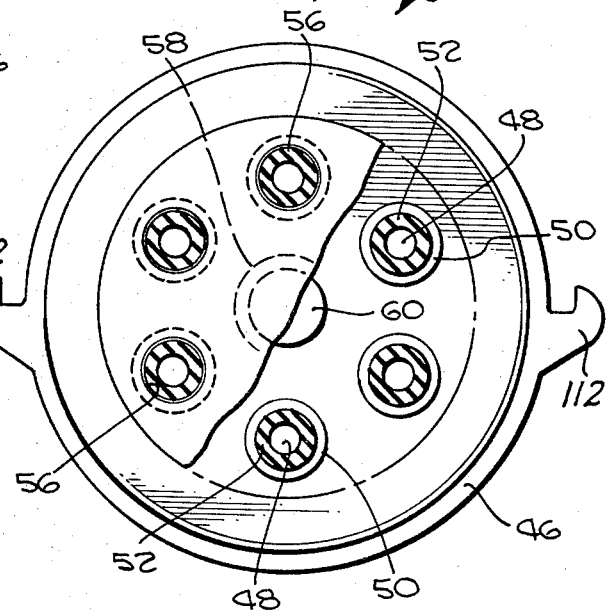

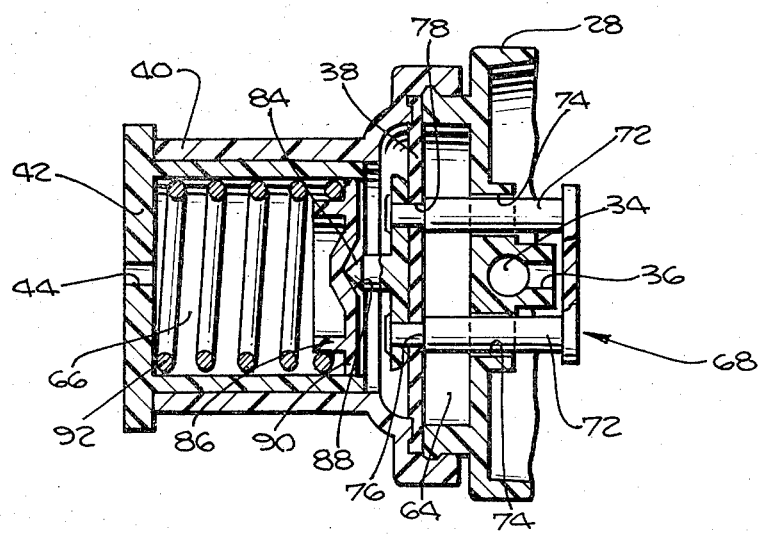
Fig. 10.
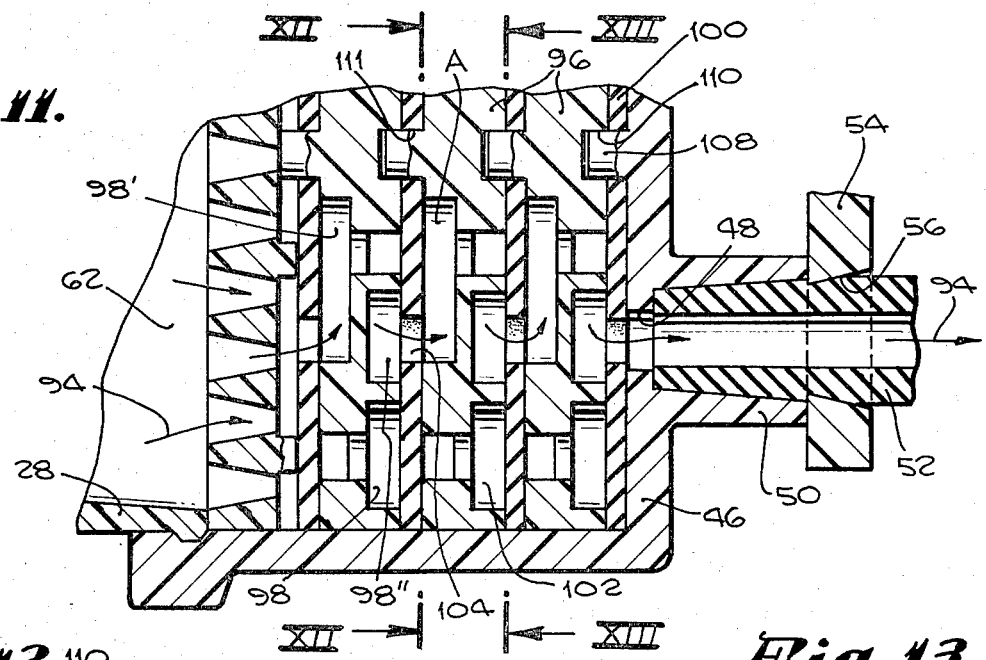
Fig. 11.
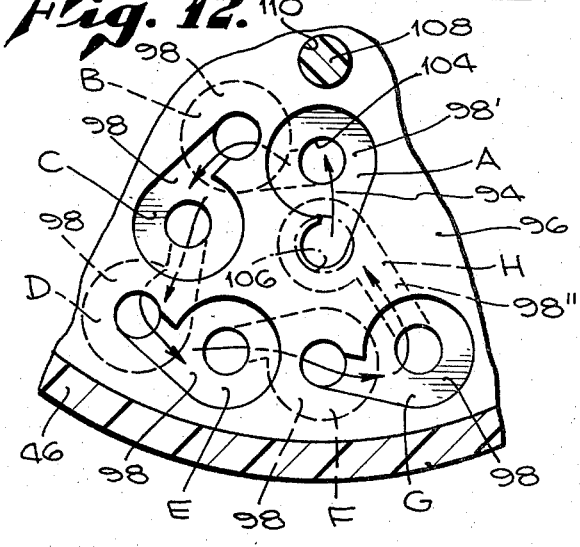
Fig. 12.
Fig. 13.

MULTIPLE VORTEX DRIPPER

BACKGROUND OF THE INVENTION

The present invention relates to irrigation systems and more particularly to irrigation systems wherein the irrigation fluid is directed to the irrigation sites by a plurality of irrigation tubings having the irrigation fluid emerging therefrom at a low volume flow rate.

So-called "drip" irrigation systems are not new in the irrigation art, but, because of severe drought conditions throughout portions of the United States in recent years, such systems have recently gained increased popularity. In such systems, rather than having large volumes of irrigation water spread from a single source over a large area whereby much of the water is lost due to run-off and evaporation, drip irrigation systems conduct the irrigation water directly to the base of the plants and the like being watered through a plurality of small diameter flexible tubes. The irrigation water emerges from the tubes at a very low pressure and flow rate so that the irrigation process is carried on for an extended period of time whereby the irrigation water is caused to penetrate deeply into the soil surrounding the roots immediately adjacent the plant.

In most such drip irrigation installations, the irrigation water is delivered to a location approximate the irrigation site by conventional metal or plastic water pipe containing the irrigation water under pressure. Some means must, therefore, be provided for accepting the high pressure irrigation water as an input thereto and providing an outlet for the attachment of a drip irrigation tube (the open end of which is placed at the base of the plant) and including internal means for dropping the pressure and the flow rate of the irrigation water being delivered to the drip irrigation tube at the output. Typically, the pressure dropping function is accomplished by passing the irrigation water through an orifice.

Taking an avocado or orange grove as an example, in a new grove only one or two application points for the delivery of drip irrigation water may be desired adjacent each tree. In a mature grove, up to six application points disposed radially around the trunk may be desired to provide an optimum watering pattern to the roots of the tree. In such an application, a delivery rate for the irrigation water of approximately two gallons per hour is desirable. The orifice employed in such apparatus is, of course, a function of the pressure in the irrigation water supply line. "Standard" line pressure in a watering system is 15 pounds per square inch (psi). At 15 pounds per square inch, a short orifice (e.g. a hole in a bulkhead or the like) of approximately 0.015 inch diameter is typically employed to provide the desired flow rate.

While such orifices work well under laboratory conditions or for a short while following initial installation, they are prone to clogging from debris flowing in the irrigation water and from eventual build-up of lime deposits and other minerals contained within the irrigation water. This is particularly true in the water available in many of the states of the southwestern region of the United States wherein such drip irrigation water systems are most desirable for use.

Numerous attempts have been made to solve the problem of the clogging of the small orifices in drip irrigation systems according to the prior art. For example, some orifices are made to be adjustable. That is, the orifice is closed down for operation and expanded to a larger size for cleaning. While such orifices are, therefore, cleanable, the mean time between failure from clogging is not changed since the orifice size during operation remains the same—that is, small.

Some orifices are made self-adjusting by having the orifice passage of greater length and partially contained within a compressible medium such as rubber disposed longitudinally to the flow path. Thus, as pressure builds up in the delivery line, the rubber or the like is compressed causing the orifice passageway to be reduced in size. While there is some degree of flexure attendant to such a design, it is typically not sufficient to maintain the orifice in a cleaned condition. Moreover, most of the deposits occur on the non-flexing portions of the rubber plug adjacent the orifice opening due to the stagant flow areas created thereby.

Another technique employed is the use of an extended helical (e.g. threaded) path. For example, the irrigation water may be passed through such a passageway of about 0.030 inch diameter for a distance of 36 inches to effect the desired pressure drop. The disadvantages of such an approach are self-evident.

In still another attempt at solving the problem, the water is passed through a series of orifices of about 0.025 inch diameter typically located in a rubber disc. Such an approach has one disadvantage in that increases in pressure tend to stretch the rubber and expand the orifices. This is, of course, just opposite of the desired reaction. Despite the shortcomings, this latter approach is the one presently favored in most commercial applications since the 0.025 inch orifice size is less prone to clogging than the 0.015 inch size while the rubber disc is an inexpensive and easily replaced item in contrast to the other more exotic apparatus available.

Additionally, prior art drip irrigation systems do not provide a workable means for adjusting the flow rates of individual groupings of irrigation tubes in a manner which affords the user thereof with reasonable control of the drip irrigation rates employed.

Wherefore, it is the object of the present invention to provide a cleanable sprinkler head for drip irrigation applications which is resistant to clogging and which provides the operator with a usable method of controlling the flow rates through individual clusters of irrigation tubes.

Moreover, it is a further objective of the present invention to provide drip irrigation apparatus providing the aforementioned objectives in a configuration particularly well-adapted for use in the easy conversion to a drip irrigation system of conventional high flow rate irrigation systems with existing buried underground supply piping having risers emanating therefrom.

SUMMARY

The foregoing objectives of the present invention have been accomplished by apparatus comprising a hollow body having an inlet thereto adapted for connection to a source of irrigation fluid under pressure and an outlet therefrom adapted for supplying drip irrigation water to an irrigation site, the body having a bulkhead disposed therein dividing the body into an inlet chamber having the inlet communicating therewith and an outlet chamber having the outlet communicating therewith, the bulkhead having a passageway therein having an inlet communicating with the inlet chamber and an outlet communicating with the outlet chamber, the passageway forming a plurality of series interconnected pressure dropping chambers being sufficient in number such that when the inlet of the hollow body is connected to a source of irrigation fluid under pressure the fluid exiting the outlet of the hollow body will be at a pressure and flow rate adapted for drip irrigation. In particular, the pressure dropping chambers are each formed to define an inlet portion having an inlet thereto; and outlet portion having an outlet therefrom and, an orifice disposed between the inlet portion and the outlet portion. More particularly, in the preferred embodiment, the outlet portion is cylindrical in shape and has the outlet thereof disposed in the center of one end of the cylinder; and, the inlet portion and the orifice are disposed to direct fluid tangentially into the cylinder whereby a vortex is formed therein having a low pressure portion formed adjacent the outlet thereof. Moreover, in the preferred embodiment, the inlet chamber includes pressure regulating means for regulating the pressure of fluid within the inlet chamber.

DESCRIPTION OF THE DRAWINGS

FIG. 1 is an illustration of the apparatus of the present invention as employed in watering individual plants and larger growing items such as trees.

FIG. 2 is a cut-away side elevation through a sprinkler head according to the present invention adapted for use in drip irrigation.

FIG. 3 is a cut-away section through the apparatus of FIG. 2 in the plane III—III.

FIG. 4 is a cut-away section through the apparatus of FIG. 2 in the plane IV—IV.

FIG. 5 is a cut-away section through the apparatus of FIG. 2 in the plane V—V.

FIG. 6 is a cut-away section through the apparatus of FIG. 2 in the plane VI—VI.

FIG. 7 is a cut-away section through the apparatus of FIG. 2 in the plane VII—VII.

FIG. 8 is a cut-away section through the apparatus of FIG. 2 in the plane VIII—VIII.

FIG. 9 is a cut-away section through the apparatus of FIG. 2 in the plane IX—IX.

FIG. 10 is a cut-away plan view through the pressure regulator portion of the apparatus of FIG. 2.

FIG. 11 is a more detailed cut-away view through a portion of the stacked plates providing the plurality of pressure dropping chambers of the present invention.

FIG. 12 is a detailed view in the plane XII—XII of the detailed section of FIG. 11.

FIG. 13 is a detailed view in the plane XIII—XIII of the detailed section of FIG. 11.

FIG. 14 is an exploded view of the apparatus of the preferred embodiment of the present invention.

DESCRIPTION OF THE PREFERRED EMBODIMENT

The apparatus to be described hereinafter is shown in simplified form in FIG. 1. Except as otherwise described, it is preferred that all the components employed herein be formed of plastics such as, for example, polyvinylchloride which are widely used in the sprinkler art. While not preferred, metal could, of course, be employed. A drip irrigation sprinkler head according to the present invention is generally designated as 10. Sprinkler head 10 comprises a hollow body 12 having an inlet 14 adapted for connection to a riser 16 extending from an irrigation pipe 18 (which in permanent installations is typically buried under the ground). Hollow body 12 has a slidable member 20 which forms the adjustment means of a pressure regulator incorporated within sprinkler head 10 and a plurality of irrigation tubes 22 connected on one end to hollow body 12 and extending on the other end adjacent plants 24 and tree 26 to be watered. Note that in the preferred embodiment being described herein, each sprinkler 10 is equipped for the connection of six irrigation tubes 22 thereto. It is to be understood that any one or more of the tubes 22 can be plugged or sealed off (or even eliminated by placing head 10 at the irrigation site) when employing the sprinkler head 10 of the present invention. It will be apparent that a number other than six also could be employed using the techniques of the present invention. Six irrigation tubes 22 emanating from one sprinkler head 10 under combined pressure/flow regulation provides a particularly desirable number in most irrigation situations. For example, six plants 24 will be within easy reach of six tubes 22 of a reasonable length with one tube 22 adjacent each plant 24. With larger plants having a larger root structure, two tubes 22 can be disposed on opposite sides of three such plants. On fairly large plants or a tree 26, three tubes 22 placed at 120° C. intervals around the trunk provide a beneficial watering pattern.

It is worthy of note at this point that the sprinkler head 10 according to the present invention having its inlet 14 disposed vertically downward is particularly adaptable for the conversion of existing high pressure sprinkler systems to drip irrigation. For example, by forming the sprinkler head 10 of conventional plastics as now employed in most sprinkler systems, the plastic risers 16 of an existing system can be conveniently cut off below the high pressure sprinkler heads and the inlets 14 of sprinkler heads 10 of the present invention attached thereto by the proper adhesive in a matter of moments so as to convert the system for drip irrigation without further access to the balance of the existing system.

Referring now primarily to FIGS. 2 and 14, the hollow body 12 of the sprinkler head 10 of the present invention is seen as comprising a cylindrical center portion 28 containing inlet 14 and having a bulkhead 30 transversely disposed internally thereof. A passageway 32 is provided through bulkhead 30. Inlet 14 is in communication with an integral inlet passageway 34 terminating in an inlet opening 36 on one side of bulkhead 30. A flexible diaphragm 38 is disposed across the opening of cylindrical center portion 28 on the opposite side of bulkhead 30 from inlet opening 36. Flexible diaphragm 38 is held in place by cylindrical regulator housing 40. Slidable member 20 comprises a cylindrical body 41 adapted to slide longitudinally in frictional engagement internally of housing 40 closed on one end by an integral cap 42 having a portion thereof of greater diameter than cylindrical regulator housing 40 thereby providing means for grasping slidable member 20 to move it in and out of cylindrical regulator housing 40 while at the same time preventing the inadvertent insertion thereof past the desired inner limit point. Integral cap 42 is provided with a hole 44 for the passage of air to allow the easy movement of slidable member 20 in and out of housing 40.

The opposite end of cylindrical center portion 28 is closed by a removable outlet cap 46 having six outlet openings 48 therein communicating with six irrigation tube connectors 50 being shaped such that irrigation tubes 52 can be inserted therein to be held in place by holding member 54 having tapered gripping holes 56 therein adapted to grip the irrigation tubes 52 and additionally having female gripping member 58 adapted to mate with male gripping member 60 carried by outlet cap 46 to hold holding member 54 and, thereby, irrigation tubes 52 in place within irrigation tube connectors 50.

It can be seen that the foregoing members (when assembled as shown in FIG. 2) form a first chamber 62 having outlet openings 48 communicating therewith, a second chamber 64 in communication with the first chamber 62 through passageway 32, and a third chamber 66 in non-communication with either the first or second chambers 62, 64.

Referring now to FIGS. 2, 5, 10, and 14, valve means generally shown as 68 is carried by the diaphragm 38 and held in communication with inlet opening 36 whereby inlet opening 36 can be opened and closed in response to movements of flexible diaphragm 38. In particular, valve means 68 comprises a closure bar 70 carried adjacent inlet opening 36 by one end of a pair of actuator bars 72 which pass through a pair of guide openings 74 disposed in bulkhead 30 on opposite sides of inlet passageway 34 to be connected to flexible diaphragm 38 on the opposite ends thereof. The ends of actuator bars 72 connected to flexible diaphragm 38 are of reduced diameter to, thereby, form a shoulder 76 on each actuator bar 72. The reduced diameter ends of actuator 72 are passed through corresponding holes 78 in flexible diaphragm 38 into corresponding holes 80 in an actuator member 82 disposed on the opposite side of flexible diaphragm 38. The ends of actuator bars 72 are secured to actuator member 82 (as by the use of a proper adhesive) with flexible diaphragm 38 held tightly between actuator member 82 and shoulders 76 whereby a leak-proof connection is provided adjacent each of the holes 78 in flexible diaphragm 38. Actuator member 82 has a conical projection 84, substantially in the center thereof, extending into third chamber 66. A cylindrical pressure member 86 is disposed within third chamber 66 adjacent actuator member 82. Pressure member 86 has a depression 88 disposed in the center thereof to mate in a frictionless manner with conical projection 84. Pressure member 86 further has a shoulder 90 disposed about the periphery thereof being of a diameter slightly smaller than the diameter of cylindrical third chamber 66 whereby pressure member 86 is free to slide longitudinally within third chamber 66. A metal bias spring 92 is disposed within third chamber 66 being held on one end by integral cap 42 and on the opposite end by shoulder 90 of pressure member 86 whereby a biasing force is created by spring 92 against pressure member 86 and thence against flexible diaphragm 38 through actuator member 82 to bias flexible diaphragm 38 and valve means 68 moving in conjunction therewith in a position wherein inlet opening 36 is open. As can be seen, a pressure regulator has, thereby, been formed integral with hollow body 12 wherein by moving slidable member 20 in and out, a greater or a lesser bias force, respectively, can be created against flexible diaphragm 38. Upon entry of irrigation water 94 under pressure through inlet 14, the irrigation water 94 enters first chamber 62 and flows thence through passageway 32 into second chamber 64 to provide an opposing force countering the bias of spring 92 on the opposite side of flexible diaphragm 38. The force of irrigation water 94 moves flexible diaphragm 38 and valve means 68 in conjunction therewith against the bias force of spring 92 towards a position closing inlet opening 36 until an equilibrium state is reached wherein the pressure within first and second chambers 62, 64 on one side of flexible diaphragm 38 is equal to the force of bias spring 92 being exerted on the opposite side of flexible diaphragm 38. Thus, it can be seen that by adjusting the bias force of spring 92 by moving slidable member 20 in and out of cylindrical regulator housing 40, the pressure within first chamber 62 can be regulated.

The sprinkler head 10 having an integral adjustable pressure regulator as heretofore described would, in itself, provide a useful improvement to the sprinkler art which could be applied to conventional sprinkler heads providing pressure and flow rates above that employed in drip irrigation. That is, tubes 52 could be connected on the ends not shown to conventional sprinkler nozzles to provide a regulatable source of low pressure water to six spray sites. Tubes 52 could also be replaced by one or more spray nozzles to provide a regulatable sprinkler head.

The primary use of the present invention is, however, directed to drip irrigation sprinkler systems as initially mentioned. To this end therefore, a secondary pressure dropping system is disposed within first chamber 62 between inlet opening 36 and outlet openings 48 whereby the pressure of the irrigation water 94 is further lowered to an adjustable range of 2 psi to 8 psi which will provide the from one gallon per hour to two gallons per hour flow rates typically desired in such apparatus.

The secondary pressure dropping function is accomplished in the present invention by passing the irrigation water 94 through a plurality of series connected pressure dropping chambers in its movement between first chamber 62 and respective outlet openings 48. In the preferred embodiment six separate pressure dropping paths are provided. Each such pressure dropping path has an inlet opening into first chamber 62 and an outlet opening communicating with one of the outlet openings 48. As will be seen from the discussion that follows hereinafter, each pressure dropping chamber along the series connected pathway incorporates an orifice that is about thirteen times larger than the typical orifice incorporated in drip irrigation systems according to the prior art and almost five times larger than those orifices in those embodiments of the prior art felt to be non-clogging by their use in conjunction with an extended path length.

In the preferred embodiment, the series connected pressure dropping chambers are provided by three disc-shaped plates 96 having shaped depressions on both sides thereof stacked with disc-shaped rubber gaskets 100 therebetween and adjacent the outer surfaces thereof. The shaped depression 98 in conjunction with the gaskets 100 covering them form a plurality of chambers 102. The plates 96 have passageways 104 therethrough being so located as to have two passageways 104 within the confines of some depressions 98 and one passageway within the confines of others when viewed from one side in a manner to be described hereinafter. In the two passageway depressions, the passageway 104 in a depression 98 on one side of a plate 96 communicates with a depression 98 on the opposite side of the plate 96 and the other passageway 104 within the same depression 98 communicates with yet another depression 98 on the opposite side of the plate 96. This can best be understood with reference to FIGS. 2, 6–9, and 11–13.

As particularly shown in FIG. 6, each gasket 100 is provided with six radially equally spaced holes 106 providing entrance to and exit from the six dropping paths formed by the covered interconnected depressions 98 contained within each plate 96. In addition to those depressions 98 having two passageways 104 therethrough, each plate 96 has six depressions 98' on one side having only one passageway 104 therethrough and six depressions 98" on the opposite side thereof also having only one passageway 104 therethrough. The depressions 98' and 98" are disposed to be adjacent holes 106 in gaskets 100 and form the points of inlet and outlet respectively to the six dropping paths formed in each plate 96. The typical flow of irrigation water 94 through a single plate can best be understood with particular reference to FIGS. 12 and 13. As FIGS. 2 and 11 are viewed, irrigation water 94 in its passage from first chamber 62 to outlet openings 48 moves from left to right. For convenience, therefore, the side of plate 96 seen in FIG. 12 will be referred to as the "front" and the side shown in FIG. 13 will be referred to as the "back". Again for convenience, as the flow of water 94 through the chambers 102 formed by the depressions 98', 98, 98" of one plate 96 is described, they will be alphabetically designated for commonality of reference in the various figures. Before describing the path of flow, however, it is first necessary to the understanding of the action of the chambers that the construction thereof be described.

In a tested embodiment of the present invention, passageways 104 are 0.055 inches in diameter thus providing 0.00238 square inches of cross-sectional area. The depressions 98, 98' and 98" are formed into plates 96 with vertical sidewalls to a depth of 0.055 inches. Each shaped depression 98 is configured like a numeral "9" having one passageway 104 at the end of the "tail" thereof and one passageway 104 forming the center of the numeral. The upper portion of the "9" is approximately 0.187 inches in diameter. With gasket 100 in place adjacent the surface of plate 96, each chamber 102, therefore, comprises an inlet portion having the inlet passageway 104 communicating with a cylindrical outlet portion having the outlet passageway 104 disposed in the center thereof through a square cross-section passageway 0.055 inches on a side or 0.003 square inches in cross-sectional area. The irrigation water 94 is, therefore, caused to flow from the outlet portion of one chamber 102 into the inlet portion of the next chamber 102 through an opening (the passageway 104) smaller than its normal flow path (i.e. an orifice). A pressure drop is, therefore, caused across the orifice in the usual manner whereby the pressure in the irrigation water 94 is dropped in moving from each chamber 102 to the next.

In addition to the pressure drop caused by the flow of water 94 from one chamber 102 into the next chamber 102 through an orifice, in the preferred embodiment as shown, each chamber 102 is configured such that water 94 in moving from the inlet passageway to the outlet passageway thereof is directed tangentially against the interior wall of the cylindrical outlet portion thus forming a vortex therein. The placement of the exit passageway 104 in the center of the cylindrical outlet portion, therefore, causes the irrigation water 94 exiting the chamber 102 through the exit passageway 104 to be at the lowest pressure within the chamber since a vortex causes a low pressure region to be created in the center of the area about which it is revolving as exemplified by water spouts, tornadoes, whirlpools, and the like. Wherefore, a combined, maximized pressure drop is created by the chambers 102 as the water 94 moves through and between them.

Returning now to FIG. 12 and 13 in particular, irrigation water 94 enters inlet chamber 102 formed by depression 98' (Chamber A) on the front side of plate 96 through one of the six holes 106 in gasket 100. From Chamber A, water 94 passes through passageway 104 to Chamber B on the back side of plate 96. Water 94 thence passes back through the second passageway 104 communicating with Chamber B to enter Chamber C at the inlet thereof on the front side of plate 96. In like manner, the water 94 passes back and forth through plate 96 through passageways 104 to pass through Chambers D, E, F, and G and thence to outlet Chamber 102 formed by depression 98" (Chamber H). From the time of entry into the inlet chamber 102 until the exit from the outlet chamber 102 of any of the six dropping paths through any plate 96, it can be seen that irrigation water 94 passing therethrough is subjected to eight combined (i.e. orifice + vortex) pressure dropping steps. Since the preferred embodiment of the present invention employs three such plates 96 connected in series, water 94 is subjected to eight times three or twenty-four such combined pressure drops from the time it leaves first chamber 62 until such time as it arrives at an outlet opening 48.

To assure proper operational alignment of plates 96 and gaskets 100 within cap 46 and relative to one another, alignment means are provided on the plate 96 and within cap 46. In particular, the interior of the closed end of cap 46 and the side of each plate 96 facing towards first chamber 62 is provided with three equally spaced projections 108 radially aligned with alternate holes 106 which holes are also disposed to be adjacent the inlet depressions 98' and outlet depressions 98" as previously discussed. The opposite side of each plate 96 is provided with three depressions 110 and each gasket 100 contains three holes 111 designed to mate with projections 108 to, thereby, hold the plates 96 and gaskets 100 in operable alignment within cap 46. In the preferred embodiment as shown, the projections 108 are cylindrical in shape and the depressions 110 and holes 111 are cylindrical holes of substantially equal diameter.

While the invention as heretofore described is complete as to the physical requirements for performing its drip irrigation functions, certain additional features have been added thereto as will be hereinafter described to provide superior operable capabilities. For example, with reference to FIGS. 9 and 14, cap 46 is provided with a pair of locking receptacles 112 disposed about the periphery thereof at 180° intervals. Cylindrical center section 28 is provided with rotatable locking arms 114 disposed to releasably interact with locking receptacles 112. Thus, cap 46 can be positioned against cylindrical center portion 28 to be held firmly in place by rotatably locking arms 114 engaging locking receptacles 112. To clean sprinkler head 10, rotatable locking arms 114 are released from locking receptacles 112 thus allowing removable outlet cap 46 to be removed and, thereafter, plates 96 and gaskets 100 to be removed for cleaning.

Referring now to FIGS. 2, 6, and 14, a disc-shaped filter screen 116 is disposed between first chamber 62 and a first gasket 100 of the stack of gaskets 100 and plates 96. Filter screen 116 provides a number of useful functions to the present invention. First, the openings thereof are sized to filter out any particles large enough to enter first chamber 62 through inlet passageway 34 and inlet opening 36 which might clog the passageways 104. Thus, particles large enough to clog the internal passageways of the chambers 102 are prevented from entry thereto. Second, filter screen 116 holes the gasket 100 of the first plate 96 adjacent the face thereof. The other gasket 100 not disposed between a pair of plates 96 is, of course, held firmly in place between the last plate 96 and the interior of the end of cap 46 as shown. Last, filter screen 116 is provided with a plurality of short spacer projections 118 over the surface thereof adjacent the first gasket 100 whereby the gasket 100 is held against the first plate 96 while at the same time a spaced area is created between filter screen 116 and first gasket 100 whereby a substantially equal pressure area is created so that all six passageways are provided with equal quantities of irrigation water 94.

Finally, cylindrical body 41 of slidable member 20 is provided with indicia 120 along the length thereof calibrated in approximate gallon per hour relationship to the position of slidable member 20 in relation to cylindrical regulator housing 40. Thus, by positioning a particular indicia 120 adjacent the end of cylindrical regulator housing 40, an operator is provided with an approximate gallon per hour flow rate of irrigation water 94 exiting outlet openings 48. In the preferred embodiment, cylindrical body 41 of slidable member 20 is also provided with raised projections 122 providing additional frictional engagement with cylindrical regulator housing 40 to prevent the inadvertent movement of slidable member 20 therein.

As can be seen from the foregoing description of the preferred embodiment of the present invention, the objectives stated earlier have been met thereby, thus providing an improved sprinkler head incorporating adjustable pressure regulation means therein and, further, incorporating a secondary pressure dropping bulkhead assembly between an interior chamber and an output chamber comprising a pathway of series connected shaped dropping chambers particularly configured to form a plurality of series interconnected vortices thus affording a total pressure drop of the irrigation water passing therethrough sufficient to lower the pressure thereof to a level adapted for drip irrigation systems.

Wherefore, having thus described my invention, I claim:

1. In a drip irrigation system including a connecting body having an inlet adapted for connection to a source of fluid under pressure and an outlet adapted for connection to an irrigation conduit for conducting a low volume of water to an irrigation site, the improvement for effecting a pressure drop between the inlet and the outlet comprising:

(a) integral pressure regulator means for controlling the pressure of the fluid within the connecting body at a pre-selected pressure communicating with the inlet of the connecting body, said pressure regulator means including means for adjusting said preselected pressure within the connecting body whereby the rate of fluid flow into the irrigation conduit can be adjusted;

(b) first pressure dropping means having a first chamber therein for forming a vortex, an inlet to said first chamber communicating with said pressure regulator means, and an outlet from said first chamber being adapted to form fluid entering said inlet thereto at a first pressure into a vortex whereby said fluid exits said outlet therefrom at a second pressure lower than said first pressure; and, (c) second pressure dropping means having a second chamber therein for forming a vortex, an inlet to said second chamber communicating directly with said outlet of said first pressure dropping means, and an outlet from said second chamber communicating with the outlet of the connecting body, said second chamber being adapted to form fluid entering said inlet thereto at said second pressure directly into a vortex whereby said fluid exits said outlet therefrom at a third pressure lower than said second pressure.

2. Apparatus for drip irrigation comprising:

a hollow body having an inlet thereto adapted for connection to a source of irrigation fluid under pressure and an outlet therefrom adapted for connection to a conduit for conducting drip irrigation water to an irrigation site, said body having a bulkhead disposed therein dividing said body into an inlet chamber having said inlet communicating therewith and an outlet chamber having said outlet communicating therewith, said inlet chamber including integral pressure regulating means for regulating the pressure of fluid within said inlet chamber, said integral pressure regulating means including means for adjusting said pressure in said inlet chamber whereby the pressure at said outlet of said hollow body and thereby the flow of drip irrigation fluid can be regulated, said bulkhead having a passageway therein having an inlet communicating with said inlet chamber and an outlet communicating with said outlet chamber, said passageway forming a plurality of series interconnected pressure dropping vortices each having an inlet with the inlet of each of said vortices directly connected to the lowest pressure point of the preceding vortex and being sufficient in number such that when said inlet of said hollow body is connected to a source of irrigation fluid under pressure the fluid exiting said outlet of said hollow body will be at a pressure and flow rate adapted for drip irrigation.

3. The apparatus for drip irrigation claimed in claim 2 wherein said bulkhead comprises:

(a) a plurality of substantially identical bulkhead plates stacked together, each of said bulkhead plates defining a passageway having an inlet thereto and an outlet therefrom and forming a plurality of series interconnected pressure dropping chambers, said bulkhead plates having said inlet and outlet disposed such that when stacked together said inlet of each of said bulkhead plates communicates with said outlet of the next adjacent of said bulkhead plates whereby a continuous passageway is formed from said inlet of the one of said plurality of bulkhead plates adjacent said inlet chamber to said outlet of the one of said plurality of bulkhead plates adjacent said outlet chamber, each of said bulkhead plates having a plurality of shaped depressions on both sides thereof forming said interconnected pressure dropping chambers when said bulkhead plates are stacked together, each of said bulkhead plates having a plurality of holes therethrough being disposed with a pair of said holes within each of said depressions such that as to respective ones of said depressions on either side of each of said bulkhead plates one of said holes is said inlet of said pressure dropping chamber and is connected to one of said depressions on the opposite side of said bulkhead plate and the other of said holes is said outlet of said pressure dropping chamber and is connected to one other of said depressions on the opposite side of said bulkhead plate; and, (b) a plurality of gaskets, one of said gaskets being disposed between adjacent pairs of said stacked bulkhead plates and two of each gaskets being disposed to cover the two outside bulkhead plates of said stacked bulkhead plates whereby said depressions are covered by said gaskets to form said chambers, said gaskets each having a hole therethrough disposed to provide an inlet opening to said plurality of series connected chambers formed in one of said plates and an outlet opening to said plurality of series connected chambers formed in the next adjacent of said plates having said gasket disposed therebetween; and wherein, (c) each of said bulkhead plates has aligning means for interacting with said aligning means on the others of said bulkhead plates whereby said bulkhead plates can only be stacked in proper operable alignment;

(d) said hollow body has aligning means for interacting with said aligning means on said bulkhead plates whereby said plurality of stacked bulkhead plates can only be disposed within said hollow body in proper operable alignment; and, (e) each of said gaskets has aligning means for interacting with said aligning means on said bulkhead plates whereby said gaskets can only be disposed against the surface of said bulkhead plates in proper operable alignment.

4. The apparatus for drip irrigation claimed in claim 2 wherein said bulkhead comprises:

(a) a plurality of substantially identical bulkhead plates stacked together, each of said bulkhead plates defining a passageway having an inlet thereto and an outlet therefrom and forming a plurality of series interconnected pressure dropping chambers, said bulkhead plates having said inlet and outlet disposed such that when stacked together said inlet of each of said bulkhead plates communicates with said outlet of the next adjacent of said bulkhead plates whereby a continuous passageway is formed from said inlet of the one of said plurality of bulkhead plates adjacent said inlet chamber to said outlet of the one of said plurality of bulkhead plates adjacent said outlet chamber, each of said bulkhead plates having a plurality of shaped depressions on both sides thereof forming said interconnected pressure dropping chambers when said bulkhead plates are stacked together, each of said bulkhead plates having a plurality of holes therethrough being disposed with a pair of said holes within each of said depressions such that as to respective ones of said depressions on either side of each of said bulkhead plates one of said holes in said inlet of said pressure dropping chamber and is connected to one of said depressions on the opposite side of said bulkhead plate and the other of said holes is said outlet of said pressure dropping chamber and is connected to one other of said depressions on the opposite side of said bulkhead plate; and, (b) a plurality of gaskets, one of said gaskets being disposed between adjacent pairs of said stacked bulkhead plates and two of said gaskets being disposed to cover the two outside bulkhead plates of said stacked bulkhead plates whereby said depressions are covered by said gaskets to form said chambers, said gaskets each having a hole therethrough disposed to provide an inlet opening to said plurality of series connected chambers formed in one of said plates and an outlet opening to said plurality of series connected chambers formed in the next adjacent of said plates having said gasket disposed therebetween; and additionally comprising a filter plate disposed within said inlet chamber between said inlet chamber between said inlet chamber and said bulkhead whereby the irrigation fluid is filtered before entering said passageway and wherein, (c) said filter plate includes a plurality of spacer elements of equal length disposed over the surface thereof adjacent said bulkhead;

(d) said filter plate is disposed close adjacent the one of said gaskets covering said bulkhead plate adjacent said filter plate whereby said one of said gaskets is held against said bulkhead plate and an equal pressure chamber is created between said filter plate and said one of said gaskets; and, (e) said one of said gaskets has a plurality of inlet holes therein whereby a plurality of said passageways are created through said bulkhead.

5. A sprinkler head comprising:

(a) a hollow body having a bulkhead disposed therein dividing said hollow body into two chambers, said bulkhead having a passageway communicating between said two chambers, said hollow body further having an inlet adapted for connection to a source of fluid under pressure including an opening into one of said chambers and an outlet from said one of said chambers;

(b) a flexible diaphragm disposed within the other of said two chambers to divide said chamber into a first portion in communication with said one chamber and a second portion in non-communication with said one chamber;

(c) valve means carried by said diaphragm disposed in operable communication with said inlet opening, said valve means being movable in combination with said diaphragm between a first position wherein said inlet opening is open and a second position wherein said inlet opening is closed, said valve means and diaphragm tending to move toward said second position in response to an increase in pressure within said first portion of said other of said two chambers; and, (d) bias means operably disposed within said second portion of said other of said two chambers for biasing said diaphragm and valve means in combination therewith in said first position whereby the pressure of the fluid in said one chamber is lower than the pressure of the fluid source to which said inlet is connected.

6. The sprinkler head claimed in claim 5 wherein: said second portion of said other chamber includes movable means for changing the amount of biasing exerted by said bias means on said diaphragm whereby the pressure within said one chamber is adjustable.

7. The sprinkler head claimed in claim 6 wherein:

said movable means is a slidable member held in position only by frictional engagement with said hollow body.

8. The sprinkler head claimed in claim 6 wherein: said movable means has positionally related indicia thereon for indicating the gallons per hour flowing from said outlet at given positions.

9. The sprinkler head claimed in claim 5 and additionally comprising:
(a) pressure dropping means disposed transverse of said one chamber for further reducing the pressure of the fluid prior to its exit from said one chamber through said outlet; and,
(b) means cooperating with said outlet for connecting a conduit thereto whereby said sprinkler head is adapted for drip irrigation use.

* * * * *